United States Patent [19]

Bolognia et al.

[11] Patent Number: 5,575,388
[45] Date of Patent: Nov. 19, 1996

[54] INSERTABLE TRAY FOR PROVIDING A MULTIPLE COMPACT DISC CONTAINER

[75] Inventors: David L. Bolognia, Lanesboro; George F. Rufo, Jr., Dalton, both of Mass.

[73] Assignee: Lakewood Industries, Inc., Pittsfield, Mass.

[21] Appl. No.: 588,271

[22] Filed: Jan. 18, 1996

[51] Int. Cl.$^6$ ................................................ B65D 85/57
[52] U.S. Cl. .................. 206/308.1; 206/310; 206/313
[58] Field of Search ........................ 206/308.1, 307, 206/309, 310, 311, 312, 313; 220/339

[56] References Cited

U.S. PATENT DOCUMENTS 5,284,243  2/1994  Gelardi et al. ................ 206/310
5,392,913  2/1995  Merrick ...................... 206/308.1 X
5,540,951  9/1995  Luckow ....................... 206/308.1

*Primary Examiner*—Jacob K. Ackun
*Attorney, Agent, or Firm*—William F. Mufatti

[57] ABSTRACT

An insertable tray for converting a single compact disc (CD) container (jewel box) into a two CD jewel box, having, however, protrusions on the front and back part of the bottom side of the insertable tray. These protrusions allow automated handling and loading of the CD into the jewel box without damaging the CD on the bottom side through automatic handling and loading the CDs onto each side of the insertable tray for a standard jewel box.

7 Claims, 4 Drawing Sheets

INSERTABLE TRAY FOR PROVIDING A MULTIPLE COMPACT DISC CONTAINER

FIELD OF THE INVENTION

The present invention relates to an improved insertable tray for compact discs in order to provide a multiple compact disc container having a compact disc seated on each side of the tray employing a standard single compact disc container without substantially modifying the interior and/or the exterior dimensions of a standard single compact disc container. Such containers are commonly or typically known as "jewel boxes," and the compact disc is typically known as a "CD." The improved insertable tray of this invention has a protrusion or rib on the bottom edge of the tray so as to allow automatic handling of the insertable trays without damaging the CD on the bottom side of the insertable tray.

BACKGROUND OF THE INVENTION

The prior art insertable tray U.S. Pat. No. 5,284,243, which is hereby incorporated by reference, provides for an insertable tray that may be employed with a standard single compact disc (hereinafter "CD") container (hereinafter "jewel box") thereby converting a single CD jewel box into a multi-CD container usually a two CD container or jewel box. The insertable tray is compatible with the single CD jewel box and is, therefore, capable of holding two (2) CDs. These insertable trays have become commercially successful and are being commercially produced. However, it has been found that as these insertable trays with one of the CDs in place on the bottom side of the tray are transported to a station for inserting the second CD on the top side of the tray, the bottom CD becomes damaged as the tray and CD are moved from one station in the automatic loading process to the next station. When these trays with the initial loading of one of the two CDs on the bottom side of the tray are stacked of upwards to fifty or more, it was discovered that the CD on the bottom tray of this stack became damaged during the automated movement of this stack from one station to the next in the automated loading process. One might suggest then that the bottom CD be merely discarded. However, in an automated system it would be difficult for one to discover the damaged CD. If discovered, the damaged CD would need to be replaced. This then becomes a hand operation, which when handling the volume of CDs going through an automated system, this can be time-consuming and labor-intensified. If merely ignored, then one is confronted with an unhappy consumer who unknowingly buys the two CD package only to find one CD damaged.

DESCRIPTION OF THE INVENTION

It has now been surprisingly discovered that by adding a protrusion or rib on the bottom side of the tray, on at least the front portion of the bottom side of the tray, damaging of the bottom most CD during automated transporting of the stacked insertable trays is eliminated.

The insertable tray briefly consists of an essentially flat part of the tray with a shelf at one end thereof and a first and second opposite sides. Each side of the insertable tray incorporates a CD engagement means and the shelf is incorporated along one edge of the tray. The shelf incorporates attachment means for attaching the tray to the storage container. A longitudinal living hinge is provided between the shelf and the flat part of the tray for providing rotational movement therebetween. The insertable tray with the shelf is snapped into the container proximal to the hinge between the container lid and container base. The consumer can access the CDs engaged on the first and second sides of the tray by rotating the insertable tray within the open container.

The engagement means on the first and second opposite sides generally consist of raised individual cantilever members which form what is commonly referred to as a rosette (hereinafter "rosette"). The rosette engages the center opening or hole of the CD.

In the improved insertable tray of this invention, the bottom side or second opposite side has longitudinal protrusions extending down from the bottom side of the tray. These longitudinal protrusions are located at least at the front of the bottom side of the tray and preferably at both the front and back ends of the bottom side of the tray. The back end of the tray has the living hinge and shelf which shelf is removably attachable to the container base. The protrusions may be continuous longitudinal protrusions from one side of the bottom side of the tray to the other side or, preferably, they may consist of interrupted protrusions. Alternatively, one protrusion may be an interrupted protrusion and the other a continuous protrusion.

DETAILED DESCRIPTION OF THE DRAWINGS

Figure 1:
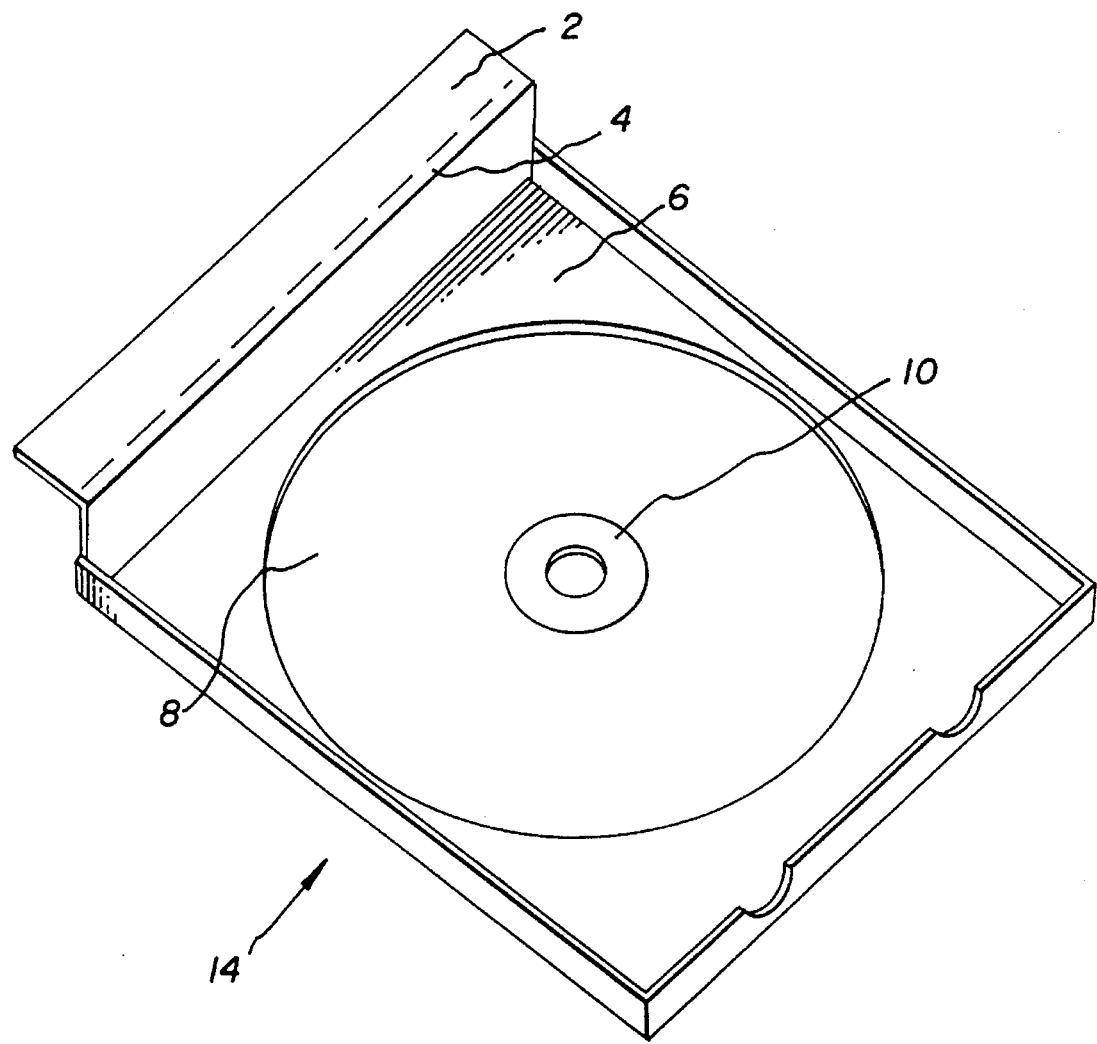
FIG. 1 is an isometric view of the prior art insertable tray of U.S. Pat. No. 5,284,243.

FIG. 1 is an isometric view of the top part of the insertable tray 14 of U.S. Pat. No. 5,284,243 comprising a shelf 2, a living hinge 4, a tray 6 with rosette 10, which rosette is merely shown schematically and which engages the CD in order to hold CD 8 on tray 6.

Figure 2:
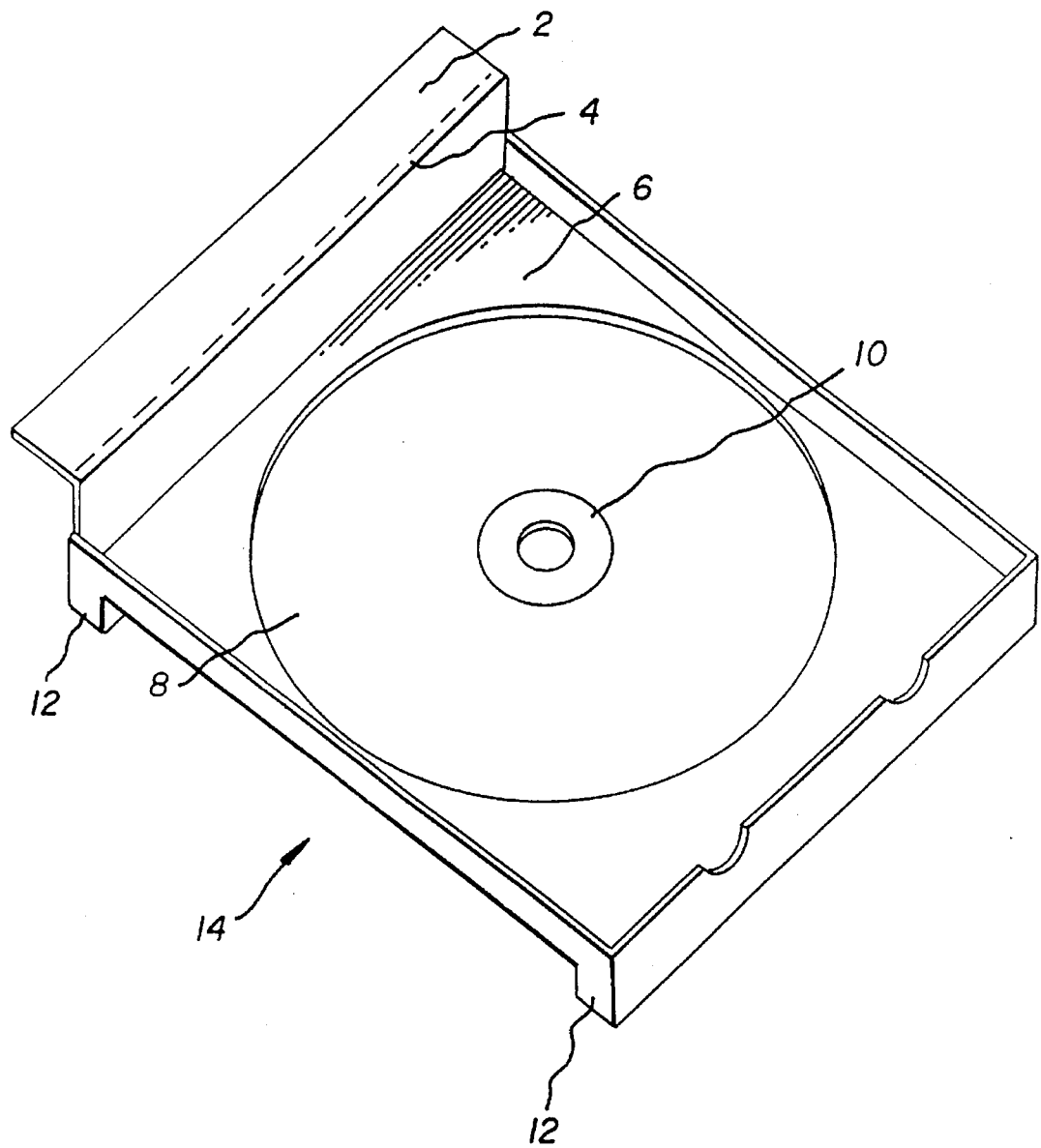
FIG. 2 is an isometric view of one embodiment of the insertable tray of this invention showing the protrusions on the bottom side of the tray.

FIG. 2 is an isometric view of one embodiment of the insertable tray 14 of this invention comprising a shelf 2, a living hinge 4, a tray 6 with rosette 10, which rosette is merely shown schematically and which engages the CD in order to hold CD 8 on tray 6, and longitudinal protrusion 12.

Figure 3:
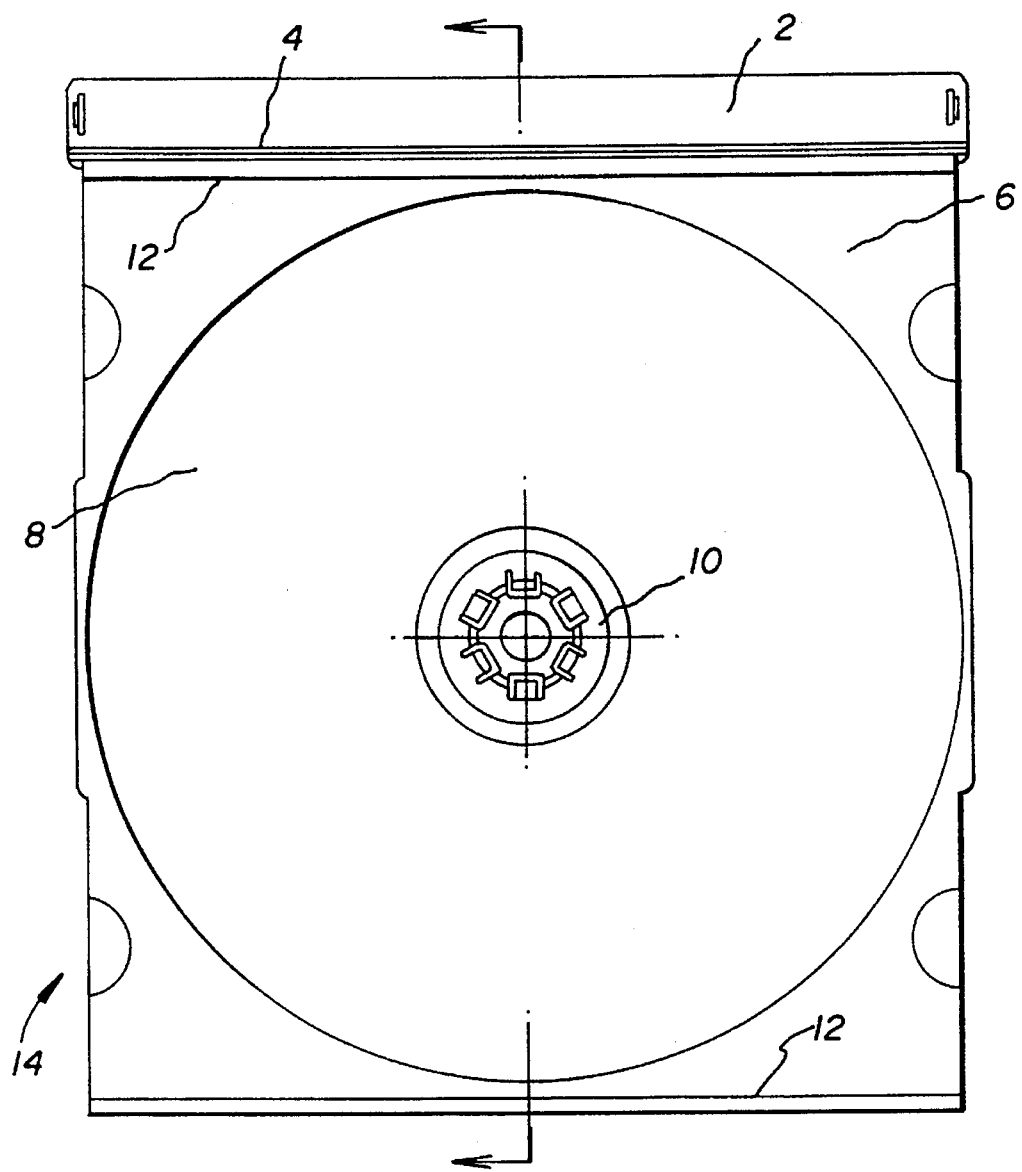
FIG. 3 is a top view of the bottom side of the insertable tray of this invention.

FIG. 3 is a top view of the bottom side of insertable tray 14 comprising protrusions 12, which are merely darkened for easy identification in FIG. 3, and extending across the full width of insertable tray 14, rosette 10 with CD 8 on tray 6 and with CD 8 engaged by rosette 10, and further comprising living hinge 4 and shelf 2.

Figure 4:
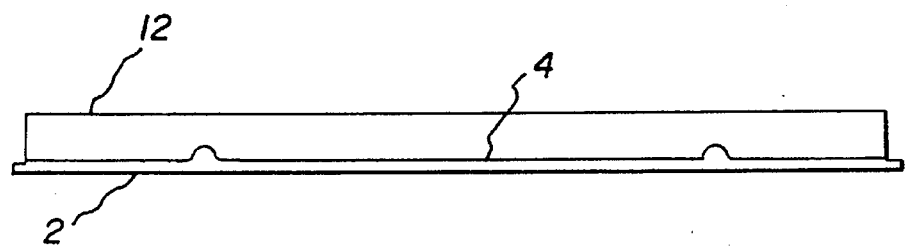
FIG. 4 is an end view of the insertable tray of FIG. 3.

FIG. 4 is a front view of insertable tray 4 of FIG. 3 comprising shelf 2, living hinge 4 and protrusion 12.

Figure 5:
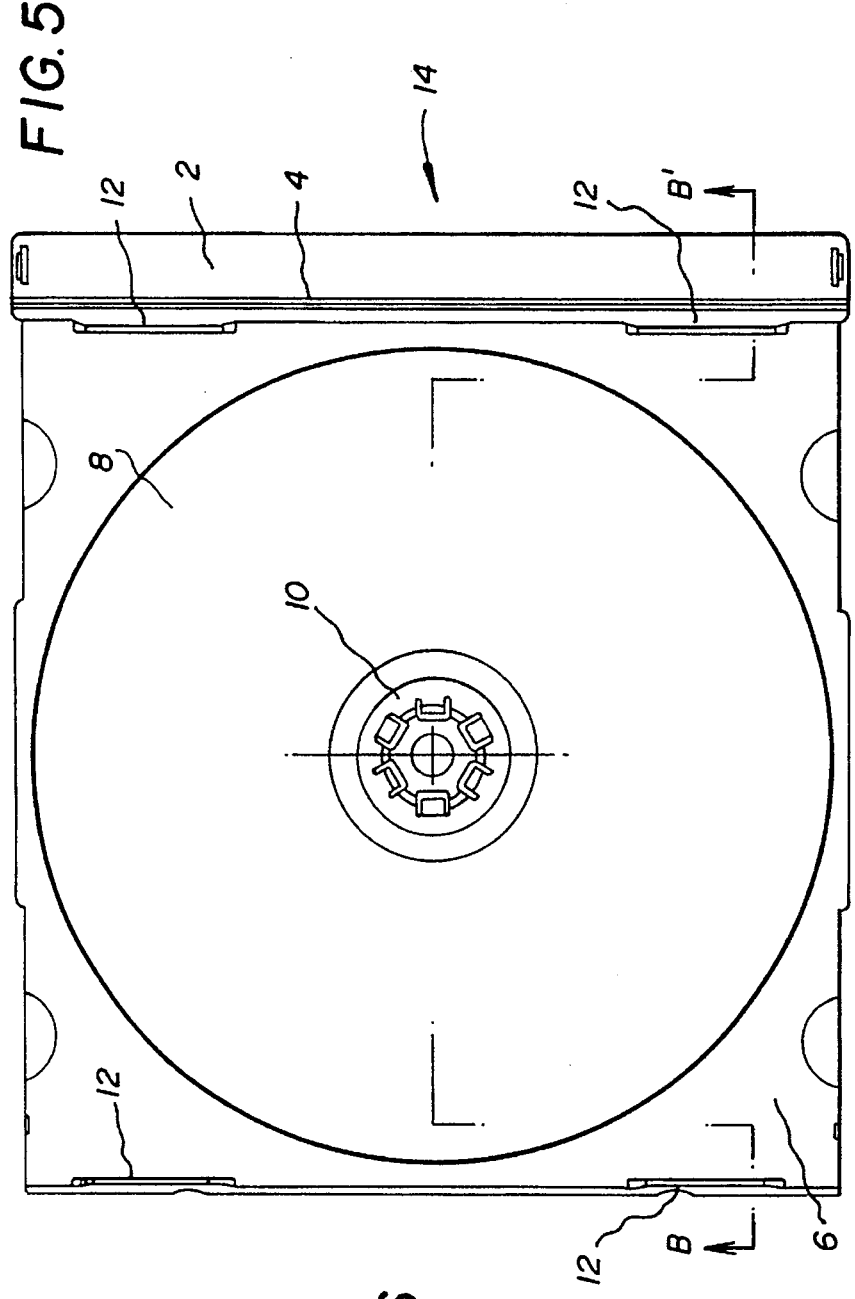
FIG. 5 is a top view of the bottom side of another embodiment of the insertable tray of this invention.

FIG. 5 is a top view of the bottom side of another embodiment of insertable tray 14, showing living hinge 4, tray 6 with rosette 10 on the bottom side for engaging CD 8, and interrupted protrusion 12.

Figure 6:
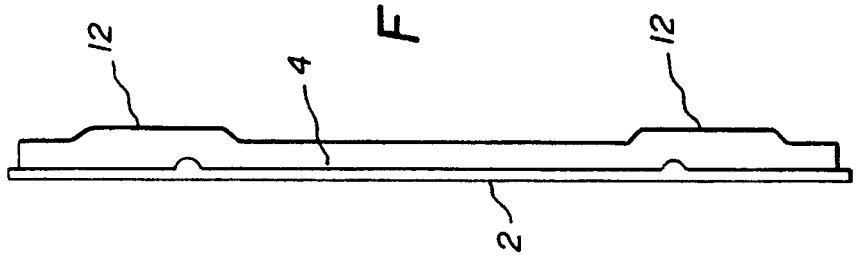
FIG. 6 is an end view of the insertable tray of FIG. 5.

FIG. 6 is a front view of the bottom side of insertable tray 14 of FIG. 5 comprising interrupted protrusion 12, living hinge 4 and shelf 2.

Figure 7:
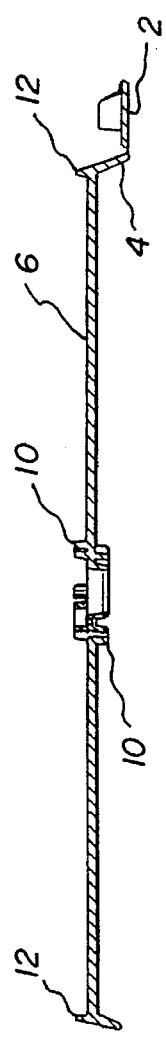
FIG. 7 is a cutaway side view of the insertable tray of FIG. 5 taken along section B–B'.

FIG. 7 is a sectional view of FIG. 5 taken along section B–B' comprising shelf 2, living hinge 4, rosette 10 on both sides of tray 6 and protrusion 12.

The present invention provides an improved insertable tray which is adaptable to today's automation process of handling trays and containers for CDs. The means for handling of trays and containers is the automatic loading of CDs onto trays and the loading of trays into containers. In the automated process, the insertable trays with at least one CD generally loaded on the bottom side of the bottom tray are stacked one on top of the other in amounts ranging upwards of 50 or more of such trays.

The stacks of trays with one CD on the bottom side of the bottom tray are moved generally by a conveyor belt from the first CD loading station of the tray (bottom side) to the loading of the second CD onto the opposite side of the tray (the top side of the tray). Due to the weight of the stack and movement of the stack by the conveyor belt, the CD on the bottom side at the bottom tray of the stack invariably is damaged. The CDs are costly and this becomes a problem as described earlier. If the damaged CD finds its way into the consumer's hands, then one has an unhappy purchaser. This invention solves this problem. The critical feature of this invention is the protrusions on the bottom side of the insertable tray in combination with the insertable tray of U.S. Pat. No. 5,284,243 which has been incorporated herein by reference.

While the invention has been described with references to specific embodiments, modifications and variations of the invention may be constructed without departing from the scope of this invention, which is defined by the following claims.

What is claimed is:

1. An insertable tray for holding at least two compact discs within a compact disc storage container having a cover and a base, which insertable tray comprises a first and second opposite sides with each side having compact disc engagement means for engaging and holding a compact disc, a connected shelf wherein the shelf has attachment means for attaching to a storage container, a longitudinal living hinge provided between the shelf and the part of the tray holding the compact discs for providing rotational movement therebetween, wherein the shelf can be removably affixed in a snap fit relationship with the base of a storage container and wherein the insertable tray has on the bottom side thereof a longitudinal protrusion on at least the front of the bottom side of the insertable tray opposite from the end of the tray containing the shelf and living hinge.

2. The insertable tray of claim 1 wherein in addition to the protrusion from the front of the bottom side thereof there is an additional protrusion on the back part of the bottom side between the living hinge and flat part of the insertable tray.

3. The insertable tray of claim 1 wherein the protrusion is continuous from one side of the tray to the other.

4. The insertable tray of claim 2 wherein both of the protrusions from the bottom side of the insertable tray are continuous from one side to the other side thereof.

5. The insertable tray of claim 1 wherein the protrusion consists essentially of interrupted protrusions.

6. The insertable tray of claim 2 wherein the additional protrusion consists essentially of interrupted protrusions.

7. The insertable tray of claim 2 wherein one protrusion from the bottom side of the insertable tray is a continuous protrusion and the other protrusion is an interrupted protrusion.

\* \* \* \* \*